(12) United States Patent
Itou

(10) Patent No.: US 8,155,542 B2
(45) Date of Patent: Apr. 10, 2012

(54) IMAGE FORMING APPARATUS WITH IMAGE CREATION CONDITION REGULATION

(75) Inventor: Shigeharu Itou, Osaka (JP)

(73) Assignee: Kyocera Mita Corporation (JP)

( * ) Notice: Subject to any disclaimer, the term of this patent is extended or adjusted under 35 U.S.C. 154(b) by 471 days.

(21) Appl. No.: 12/416,770

(22) Filed: Apr. 1, 2009

(65) Prior Publication Data

US 2009/0296160 A1  Dec. 3, 2009

(30) Foreign Application Priority Data

May 28, 2008 (JP) .................. 2008-139227

(51) Int. Cl.
*G03G 15/00* (2006.01)
(52) U.S. Cl. .......................... 399/43; 399/49
(58) Field of Classification Search .................. 399/43, 399/49, 72, 38; 358/406, 504
See application file for complete search history.

(56) References Cited

U.S. PATENT DOCUMENTS

| | | | | |
|---|---|---|---|---|
| 5,946,524 A | * | 8/1999 | Taniguchi | 399/43 X |
| 6,181,890 B1 | * | 1/2001 | Kataoka et al. | 399/43 X |
| 6,385,412 B1 | * | 5/2002 | Sadakuni | 399/43 X |
| 6,615,002 B2 | * | 9/2003 | Saito et al. | 399/43 |
| 7,251,421 B2 | * | 7/2007 | Yoshizuka et al. | 399/43 |

FOREIGN PATENT DOCUMENTS

JP 2002-189391 A 7/2002

* cited by examiner

*Primary Examiner* — Sophia S Chen
(74) *Attorney, Agent, or Firm* — Ostrolenk Faber LLP

(57) ABSTRACT

An image forming apparatus includes an image forming unit, image formation control section, counter, image formation condition regulation section, controlled printed-paper number storage section, and regulation control section. The image forming unit includes a plurality of functional sections. The counter counts a cumulative printed-paper number in a series of image formation processing. The image formation condition regulation section regulates an image formation condition of at least one of the functional sections. The controlled printed-paper number storage section stores a benchmark printed-paper number and first allowable value to determine the timing of regulating the image creation condition. The first allowable value is set to be less than the benchmark printed-paper number. The regulation control section activates the image creation condition regulation section after the series of image formation processing when the cumulative printed-paper number is equal to or greater than the first allowable value after the series of image formation processing.

12 Claims, 13 Drawing Sheets

IMAGE FORMING APPARATUS WITH IMAGE CREATION CONDITION REGULATION

CROSS-REFERENCE TO RELATED APPLICATIONS

This application claims priority under 35 U.S.C. §119 to Japanese Patent Application No. 2008-139227 filed on May 28, 2008. The entire disclosure of Japanese Patent Application No. 2008-139227 is hereby incorporated herein by reference.

BACKGROUND OF THE INVENTION

Field of the Invention

The present invention relates to an image forming apparatus, and especially to an image forming apparatus for regulating image creation conditions of functional sections contributing to image formation.

There are occasions when a conventional image forming apparatus (e.g., an electro-photographic copier) does not regularly maintain density for a toner image formed on an image carrier due to environmental changes (e.g., temperature change) and time-dependent changes (e.g., deterioration of toner and an image carrier such as a photosensitive body). In order to avoid the density change for a toner image, an image forming apparatus is configured to regulate operational conditions of functional sections, respectively, when the cumulative number of printed paper reaches a preliminarily-set predetermined number or when the cumulative operation time of a printer engine reaches a preliminarily-set predetermined time. Note the operational conditions of the functional sections are also hereinafter simply referred to as "image creation conditions." Additionally, regulation of an image creation condition is also hereinafter simply referred to as "correction."

For example, the image forming apparatus is configured to form a toner patch on a photosensitive body for regulating toner density and to detect density of the toner patch in the aforementioned timing, then, a development bias value (i.e., an example of the image creation conditions) is regulated based on the detected toner patch density.

However, when regulation of an image creation condition is executed during consecutive print processing, the print processing is configured to be suspended.

Japan Patent Application Publication No. JP-A-2002-189391 discloses a printing apparatus for solving the aforementioned problem. The printing apparatus includes patch formation means, timing determination means, printing execution determination means and control means. The patch formation means is configured to hold data for indicating timing of forming a patch image for correction and form a patch image in accordance with the timing of the data. The timing determination means is configured to determine if the aforementioned patch image formation timing data are used for forming a patch image every time the predetermined number of printing is performed. The printing execution determination means is configured to determine if there still exists data for the predetermined amount of printing when the timing determination means determines that the patch image formation timing data are used for the patch image formation. The control means is configured not to execute patch image formation when the printing execution determination means determines that there still exists data for the predetermined amount of printing.

According to the printing apparatus of the aforementioned publication, the print processing is not suspended for correction. However, when correction timing comes in an early stage of the consecutive print processing for printing a plurality of paper, for instance, correction is not executed during the print processing. Accordingly, the printed material may not have good image quality as a result of the print processing.

In view of the above, it will be apparent to those skilled in the art from this disclosure that there exists a need for an improved image forming apparatus. This invention addresses this need in the art as well as other needs, which will become apparent to those skilled in the art from this disclosure.

SUMMARY OF THE INVENTION

Accordingly, aspects of the present invention have been created to solve the aforementioned problems occurring in the conventional practice, and to provide an image forming apparatus for maintaining image quality while preventing functional sections from starting operations of regulating operation conditions during print processing as much as possible.

An image forming apparatus of a first aspect of the present invention includes an image forming unit, an image formation control section, a counter, an image creation condition regulation section, a controlled printed-paper number storage section, and a regulation control section. The image forming unit includes a plurality of functional sections for image formation. Each of the functional sections is configured to control an image creation condition, and contributes to the image formation in the image creation condition. The image formation control section is configured to control the functional sections for causing the image formation unit to execute the image formation. The counter is configured to count cumulative printed-paper number in a series of image formation processing. The image creation condition regulation section is configured to regulate an image creation condition of at least one of the functional sections. The controlled printed-paper number storage section is configured to store a benchmark printed-paper number and a first allowable value for determining a timing of regulating the image creation condition. The first allowable value is set to be less than the benchmark printed-paper number. The regulation control section is configured to activate the image creation condition regulation section after the series of image formation processing when the cumulative printed-paper number is equal to or greater than the first allowable value after the series of image formation processing.

According to the image forming apparatus, when the cumulative printed-paper number reaches the first allowable value after the image forming control section forms a series of printing images, the regulation control section activates the image creation condition regulation section. Accordingly, the image creation condition control section regulates the image creation condition.

This reduces the probability of suspending the next print processing to be executed after the series of print processing due to regulation of an image creation condition. Consequently, printing will be smoothly executed.

An image forming apparatus of a second aspect of the present invention includes an image forming unit, an image formation control section, a measurement device, an image creation condition regulation section, a controlled time storage section, and a regulation control section. The image forming unit includes a plurality of functional sections for image formation. Each of the functional sections is configured to control an image creation condition, and contributes to the image formation in the image creation condition. The image formation control section is configured to control the functional sections for causing the image forming unit to execute processing of the image formation. The measurement device is configured to measure cumulative operation time in a series of image formation processing. The image creation condition regulation section is configured to regulate an image creation condition of at least one of the functional sections. The control time storage section is configured to store a benchmark operation time and first allowable value for determining the image creation condition. The first allowable value is set to be less than the benchmark operation time. The regulation control unit is configured to activate the image creation regulation section after the series of image formation processing when the cumulative operation time is equal to or greater than the first cumulative value after the series of image formation processing.

According to the image forming apparatus, when the cumulative operation time reaches the first allowable value after the image formation control section forms a series of printing images, the regulation control section activates the image creation condition regulation section. Accordingly, the image creation condition regulation section regulates the image creation condition.

This reduces the probability of suspending the next print processing to be executed after the series of print processing due to regulation of an image creation condition. Consequently, printing will be smoothly executed.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

An image forming apparatus of an embodiment of the present invention will be hereinafter explained in detail. In the embodiment, a tandem color digital copier will be an example of the image forming apparatus.

Entire Structure and Configuration of Copier

Figure 2:
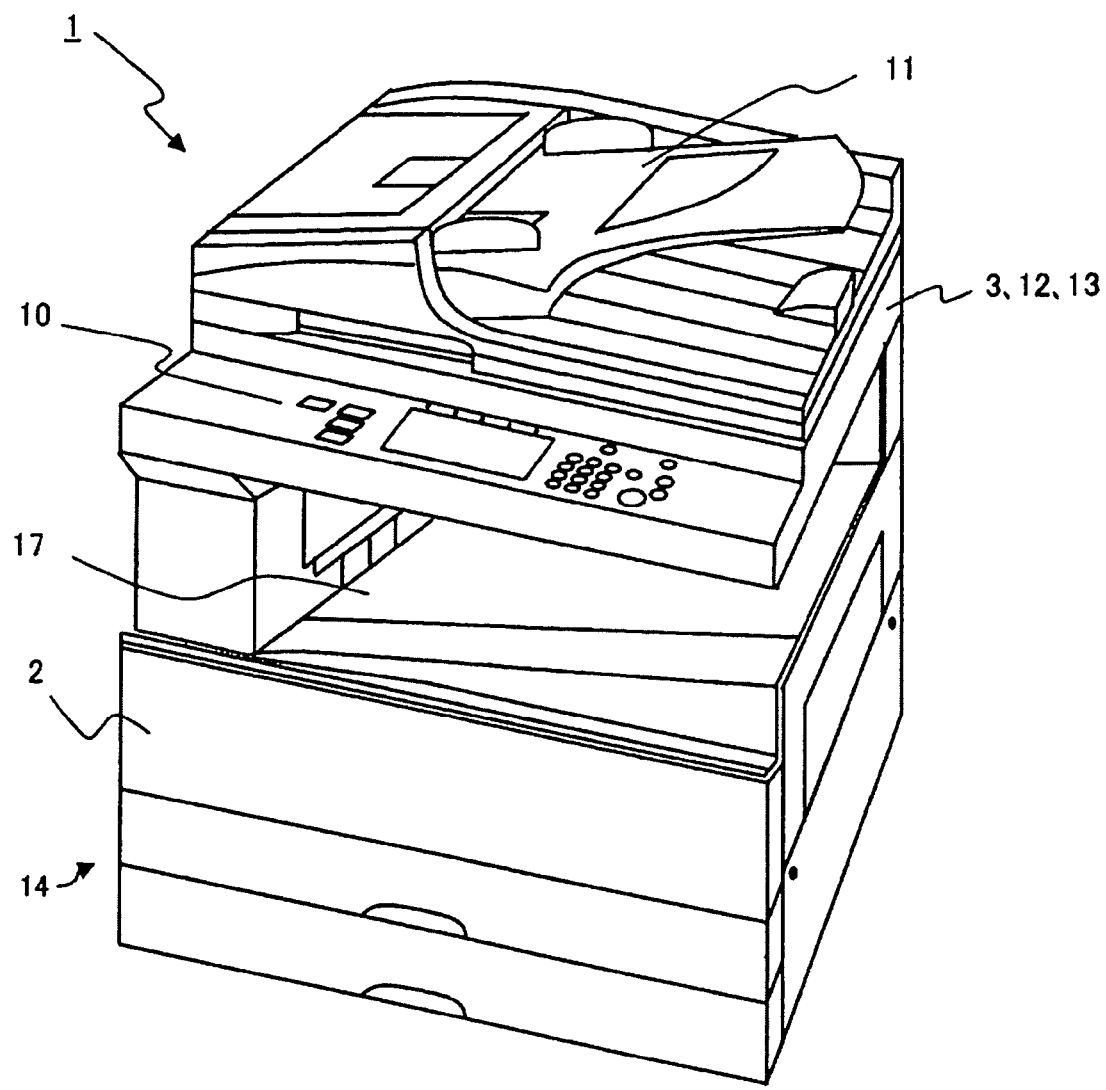
FIG. 2 is a perspective view of the color digital copier.

FIG. 2 illustrates a color digital copier 1. The color digital copier 1 includes a variety of sections such as an operating section 10, an image scanning section 12, an image processing section 13, and a printer engine 2. In the operating section 10, a display unit with a liquid crystal display (LCD) screen and a variety of keys including a start key to start a copy operation are arranged. The image scanning section 12 is configured to sequentially feed a single or plurality of sheets of documents put on a document feeder plate 11, to scan an image of the fed document, and to obtain digital image data of the fed document image by executing a photoelectric conversion. The image processing section 13 is configured to convert the digital image data into output image data of four color components: magenta (M), cyan (C), yellow (Y), and black (B), by executing a variety of image processing (e.g., gradation conversion, color adjustment, and magnification conversion) with respect to the digital image data. The printer engine 2 is configured to form a toner image to be printed out based on the output image data, transfer and fix the toner image onto a sheet of recording paper, and discharge the sheet of recording paper.

Structure and Configuration of Printer Engine

Figure 3:
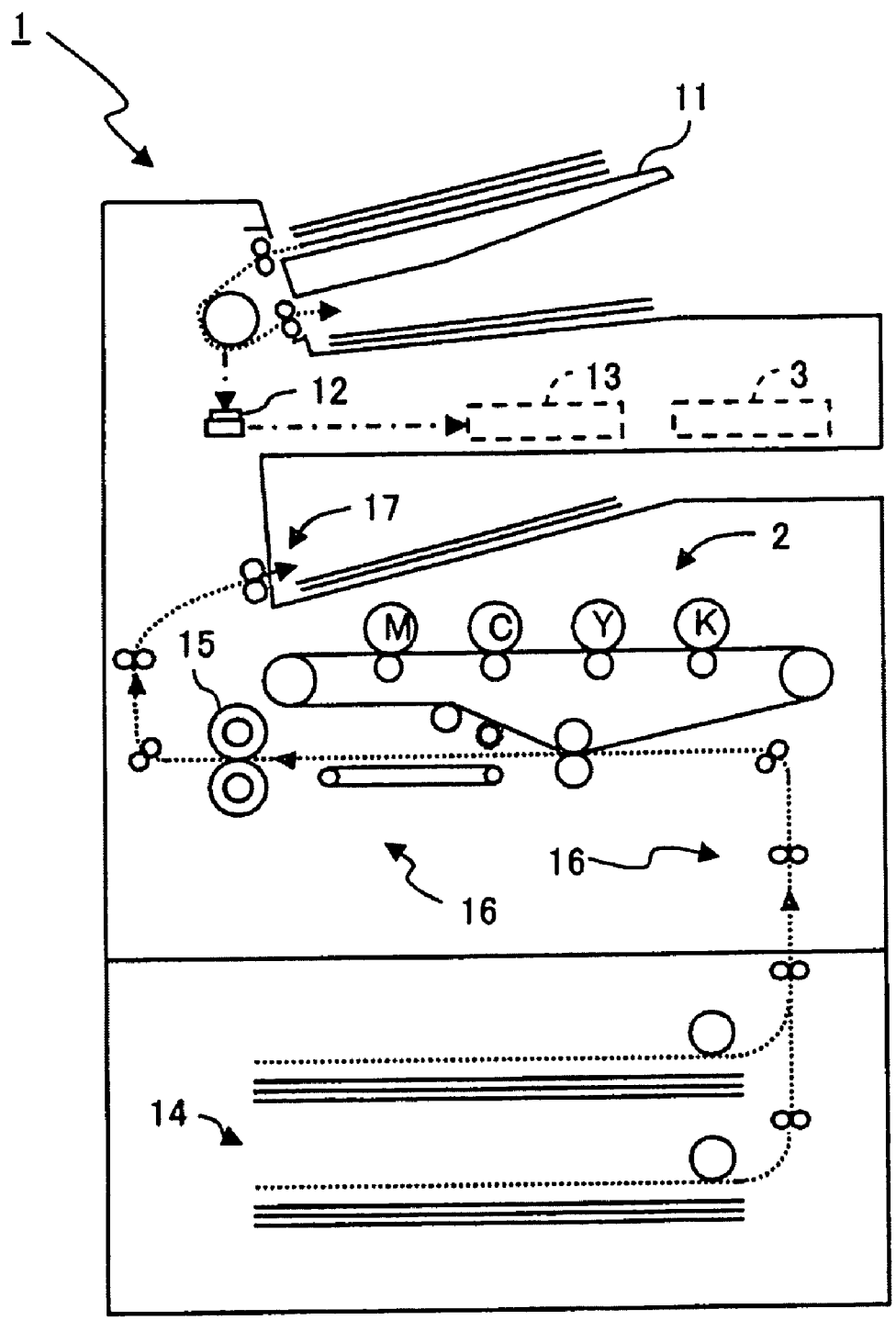
FIG. 3 is a view of a schematic diagram of the interior of the color digital copier.
Figure 4:
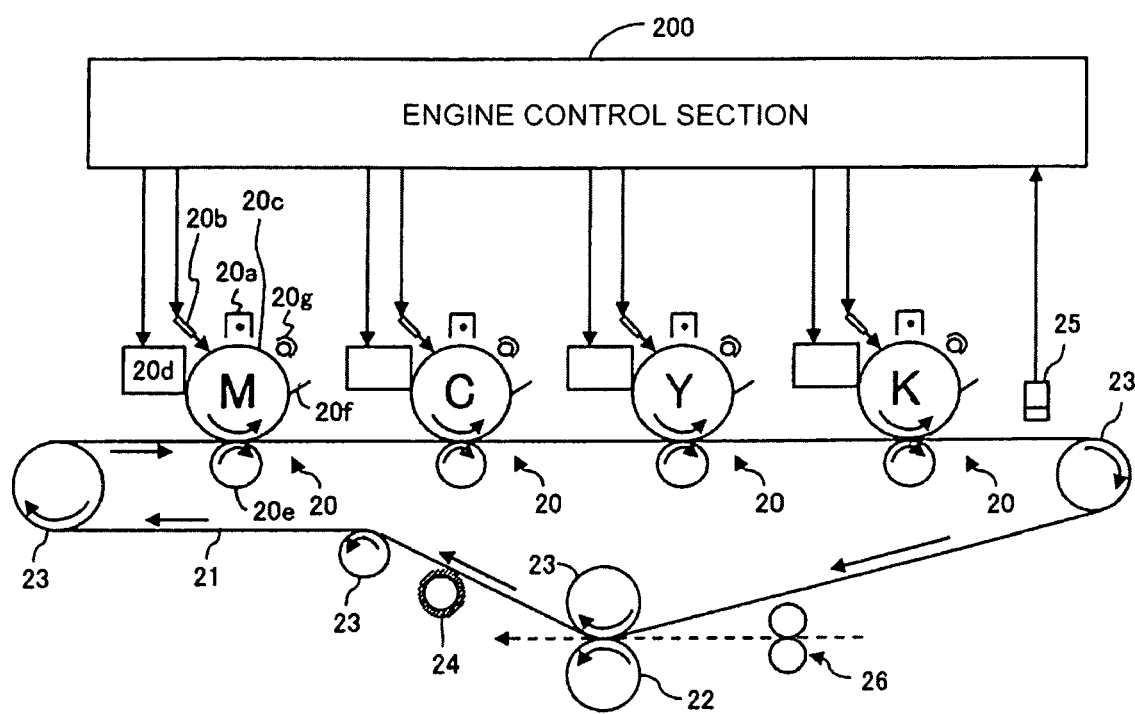
FIG. 4 is a view of a schematic diagram of photosensitive units and an intermediate transfer belt of the color digital copier.

As illustrated in FIGS. 3 and 4, the printer engine 2 preferably includes four photosensitive units 20, four primary transfer rollers 20e, an intermediate transfer belt 21, and a secondary transfer roller 22. Each of the primary transfer rollers 20e is configured to transfer primarily toner images formed on each of the photosensitive units 20 onto the intermediate transfer belt 21. Then, the secondary transfer roller 22 is configured to transfer secondarily the toner image transferred onto the intermediate transfer belt 21 onto a sheet of recording paper. Furthermore, the printer engine 2 includes a fixation section 15 and a transportation mechanism 16. The fixation section 15 is configured to fix the image secondarily transferred onto the sheet of recording paper by heating it. The transportation mechanism 16 is configured to transport a sheet of recording paper fed from an accommodation section 14 to a nip formed by the intermediate transfer belt 21 and the secondary transfer roller 22 and to the fixation section 15, and finally to discharge the sheet of recording paper through a discharge section 17 after the image is fixed onto the sheet of recording paper.

The four photosensitive units 20 are arranged along the circumferential direction of the intermediate transfer belt 21. The photosensitive units 20 correspond to four toner colors:

magenta (M); cyan (C); yellow (Y); and black (B). The photosensitive units 20 of magenta (M), cyan (C), yellow (Y) and black (B) are preferably sequentially arranged from the upstream to the downstream in this order.

The photosensitive units 20 preferably have the same structure. Specifically, each of the photosensitive units 20 includes a photosensitive body 20c, an electrostatic charger 20a and an exposure head 20b. The electrostatic charger 20a is configured to uniformly charge the surface of the photosensitive body 20c. The exposure head 20b is configured to be driven based on the output image data corresponding to the toner color of the photosensitive unit 20 including the exposure head 20b. Furthermore, each of the photosensitive units 20 includes a developing device 20d, a cleaning blade 20f and a neutralizer lamp 20g. The exposure head 20b is configured to expose the surface of the photosensitive body 20c for forming an electrostatic latent image. The developing device 20d is configured to develop the electrostatic latent image formed on the photosensitive body 20c for forming a toner image. The cleaning blade 20f is configured to remove toner remaining on the photosensitive body 20c after the primary transference of the image onto the intermediate transfer belt 21. The neutralizer lamp 20g is configured to neutralize electric charges on the surface of the photosensitive body 20c.

The intermediate transfer belt 21 is supported by a support roller 23. The intermediate transfer belt 21 is configured to circulate at a predetermined speed. After the secondary transfer roller 22 secondary transfers the image on the intermediate transfer belt 21 onto the sheet of recording paper, the toner image remaining on the intermediate transfer belt 21 is removed by a fur brush 24. The fur brush 24 is arranged in the downstream of the secondary transfer roller 22.

The fixation section 15 includes a heat roller and a pressure roller. The heat roller includes an insertion heater in its interior, and is heated by it. The pressure roller forms a nip with the heat roller. A sheet of recording paper is transported through the nip while interposed between the heat roller and the pressure roller.

The transportation mechanism 16 includes a single or plurality of feeding rollers and a single or plurality of pairs of transportation rollers. The feeding roller is configured to feed a sheet of recording paper from the accommodation section 14 storing a single or plurality of sheets of recording paper. The pair of transportation rollers is configured to transport the sheet of recording paper. Furthermore, the transportation mechanism 16 includes a pair of resist rollers 26, a transportation belt, and a discharge roller. The pair of resist rollers 26 is configured to correct the orientation of the front edge of a sheet of recording paper in the traveling direction and to send the sheet of recording paper to the primary transfer roller 20e while adjusting transference timing. The transportation belt is configured to transport the sheet of recording paper to the fixation section 15 after the image formed in the photosensitive units 20 is transferred onto the sheet of paper. The discharge roller is configured to discharge the sheet of recording paper through the discharge section 17 after the image is fixed onto the sheet of recording paper.

Structure and Configuration for Control

Figure 1:
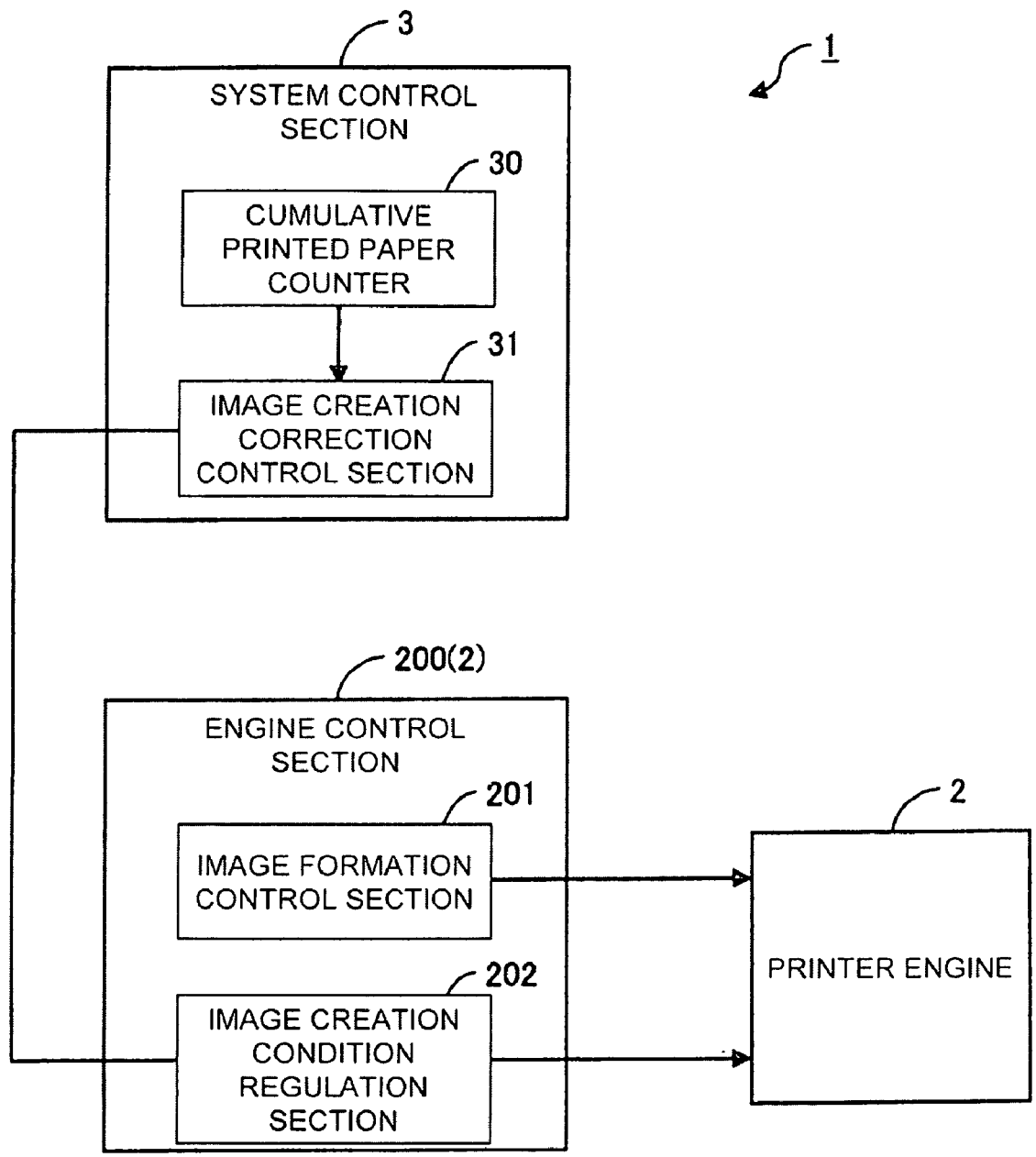
FIG. 1 is a view of a block diagram of a color digital copier according to a preferred embodiment of the present invention.

As seen in FIG. 1, the color digital copier 1 includes an operating control section, an image scanning control section, an engine control section 200, and a system control section 3. The operating control section is configured to control the operating section 10. The image scanning control section is configured to control the image scanning section 12. The engine control section 200 is configured to control the printer engine 2. The system control section 3 is configured to control entirely these control sections.

Each of the control sections preferably includes a CPU, a ROM, a RAM, an input circuit, and an output circuit. The ROM is configured to store control programs to be executed by the CPU. The RAM is configured to store a variety of data such as control data. The RAM and ROM of the control section 3 is configured to act as a controlled printed-paper number storage section that stores a benchmark printed-paper number and first allowable value to determine a timing of regulating the image creation condition, or to act as a controlled time storage section that stores a benchmark operation time and first allowable value to determine timing of regulating the image creation condition. The input circuit is configured to receive signals from a variety of sensors and the like. The output circuit is configured to output control signals to a variety of driving devices such as a motor.

As illustrated in FIG. 1, the engine control section 200 includes an image formation control section 201 and an image creation condition regulation section 202. The image formation control section 201 is configured to form an image on an image carrier composed of the photosensitive body 20c and the intermediate transfer belt 21 by controlling an image creation related load. The image creation condition regulation section 202 is configured to regulate an image creation condition of the image creation related load. The system control section 3 includes an image creation condition correction control section (regulation control section) 31 for activating the image creation condition regulation section 202 every time the printed number of recording paper reaches a preliminarily-set predetermined number.

Each of the functional sections in the engine control section 200 and the system control section 3 are allowed to function by the interaction of the CPU for executing the control program stored in the RAM and the hardware such as the input circuit and the output circuit. Thus, the engine control section 200 and the system control section 3 form parts of the image forming unit that has a plurality of functional sections.

Structure and Configuration of Image Formation Control Section 201

Referring to FIGS. 1 and 4, the image formation control section 201 is configured to control each of the photosensitive units 20. Specifically, the image formation control section 201 causes the electrostatic charger 20a to charge uniformly the surface of the photosensitive body 20c by applying voltage from the electrostatic charger 20a. Then, the image formation control section 201 causes the exposure head 20b to expose and to scan the surface of the photosensitive body 20c based on the output image data converted from the digital image data by the image processing section 13. Accordingly, an electrostatic latent image is formed on the surface of the photosensitive body 20c. Furthermore, the image formation control section 201 is configured to apply a development bias to the developing device 20d. Accordingly, toner flies from the developing device 20d to the electrostatic latent image. The electrostatic latent image becomes visible, and thus a toner image is formed on the surface of the photosensitive body 20c.

The image formation control section 201 is configured to apply transference bias voltage to the primary transfer roller 20e, and to transfer the four color toner images to the intermediate transfer belt 21 while the toner images are overlapped to each other. Note the polarity of the transference bias voltage is opposite to that of the charged toner. Furthermore, the image formation control section 201 is configured to apply the transference bias voltage to the secondary transference roller 22, and to transfer the toner image onto the sheet of recording paper.

Structure and Configuration of Image Creation Condition Correction Control Section 31

The image creation condition correction control section 31 is configured to activate the image creation condition regulation section 202 based on the count of a cumulative printed paper counter 30. The cumulative printed paper counter 30 is configured to count the cumulative printed number of recording paper. Specifically, the cumulative printed paper counter 30 increments the count every time the image formation control section 201 completes print processing with respect to a sheet of recording paper.

In this case, the battery-backup RAM (hereinafter simply referred to as "RAM") is configured to store the cumulative printed number of recording paper counted by the cumulative printed paper counter 30. The RAM is provided in the system control section 3. When the image creation condition regulation section 202 is activated, the cumulative printed paper counter 30 is configured to reset the count. Thus, the cumulative printed paper counter 30 also functions as a system control section that resets the count when the image creation condition regulation section 202 is activated.

When the cumulative printed number of recording paper reaches the first allowable value after the image formation control section 201 executes a series of print processing, the image creation condition correction control section 31 is configured to activate the image creation condition regulation section 202 after the series of print processing. The first allowable value is set to be less than the preliminarily-set printed number of recording paper as a threshold for activating the image creation condition regulation section 202 (hereinafter referred to as the "correction benchmark printed number"). Also, the term "a series of print processing" means sequential print processing for printing out a plurality of recording paper in a print job to be started in conjunction with operation of the start key.

For example, when the correction benchmark printed number is set to 500, the first allowable value is preferably set to 90-95% of 500. However, the correction benchmark printed number and the first allowable value is suitably set in accordance with, for instance, the printed number per unit time of the image forming apparatus adopting the present invention. Therefore, the correction benchmark printed number is not limited to the aforementioned value for achieving the operational advantages of the present invention.

As described above, the cumulative printed number is reset when the image creation condition regulation section 202 is activated. Accordingly, the cumulative printed number has little chance to reach the correction benchmark printed number during the next print job to be executed after the series of print processing. Therefore, the next print job has little change to be suspended.

Structure and Configuration of Image Creation Condition Regulation Section 202

An image creation condition regulation operation of the image creation condition regulation section 202 will be hereinafter explained. The image creation condition regulation section 202 is configured to recover deteriorated developer (i.e., a mixture of toner and carrier) on a developing sleeve of the developing device 20d, and refresh toner developer to be supplied to the developing sleeve.

The image creation condition regulation operation will be hereinafter specifically explained with the developing device 20d of FIGS. 5A and 5B. In this case, the developing device 20d adopts a so-called two-component development system for executing development with a magnetic brush formed by developer. The developing device 20d includes a developing sleeve 20i and a sleeve 20j. The developing sleeve 20i includes a fixed magnetic roller 20h. The fixed magnetic roller 20h is magnetized to have alternating N and S polarities. The sleeve 20j is arranged in the rotation-directionally upstream of the development position of the developing sleeve 20i.

Figure 5A:
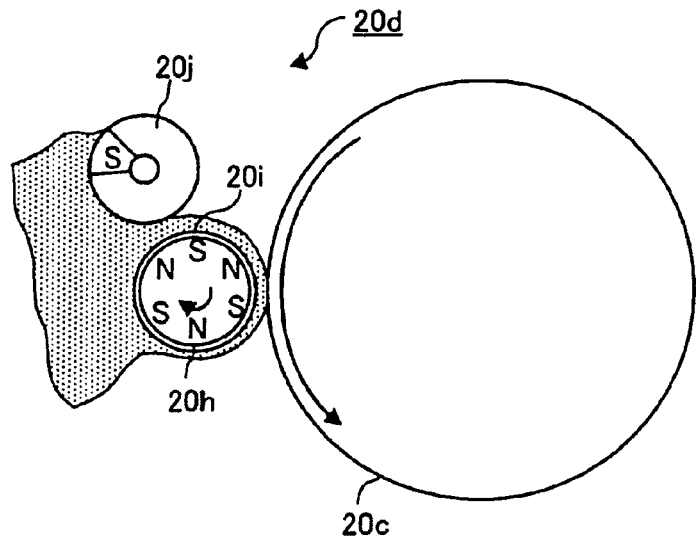
FIG. 5A is a view of a schematic diagram of a developing device of the color digital copier.

As illustrated in FIG. 5A, a magnetic brush is formed on the developing sleeve 20i by way of the magnetic power of the fixed magnetic roller 20h. The tip of the magnetic brush makes contact with the peripheral surface of the sleeve 20j. Accordingly the thickness of the tip of the magnetic brush is regulated. An electrostatic latent image on the photosensitive body 20c is developed by the toner attaching to the magnetic brush carried by the developing sleeve 20i.

Figure 5B:
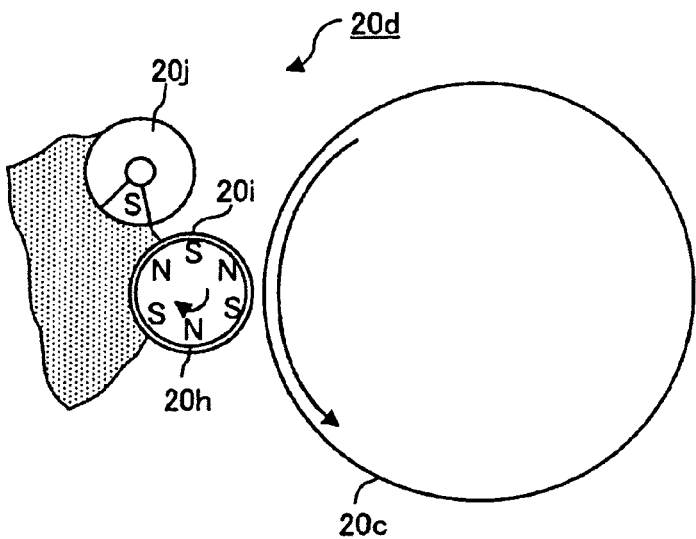
FIG. 5B is a view of a schematic diagram of the developing device.

As illustrated in FIG. 5B, the image creation condition regulation section 202 is configured to rotate the sleeve 20j by controlling the motor and the like for recovering the developer on the developing sleeve 20i. Accordingly, a magnet inserted and fixed into the sleeve 20j comes close to the vicinity of the developing sleeve 20i, or moves or rotates toward the developing sleeve 20i. A magnetic bridge is then formed by the opposed magnetic poles, that is, the magnetic pole of the fixed magnetic roller 20h of the developing sleeve 20i and that of the inserted magnet of the sleeve 20j. Consequently, the developer carried by the developing sleeve 20i is recovered through the magnetic bridge.

The deteriorated developer recovered from the developing sleeve 20i is agitated with the developer stored in the developing device 20d. Subsequently, the developing sleeve 20i carries developer anew. Thus, the image creation condition regulation section 202 regulates the charged amount of toner and the like (i.e., an example of image creation conditions of the developing device 20d as the image creation related load).

Yet another example of the image creation condition regulation operation will be hereinafter explained with a developing device 20d adopting a so-called hybrid development system. In this case, the developing device 20d includes a transportation roller and a developing roller. The transportation roller is configured to hold a magnetic brush formed by developer. The developing roller is configured to form a thin toner layer with the toner transported through the magnetic brush held by the transportation roller. Additionally, the developing device 20d is configured to execute development with the toner held by the developing roller.

The developing device 20d is configured to apply direct bias voltage to the transportation roller whereas it is configured to apply direct bias voltage overlapped with alternating bias voltage to the developing roller. Accordingly, the toner is transported to the developing roller through the magnetic brush carried by the transportation roller.

The image creation condition regulation section 202 is configured to change the magnitude of direct bias voltage to be applied to the developing roller or that of the direct bias voltage to be applied to the transportation roller for recovering the toner carried by the developing roller. Accordingly, the toner carried by the developing roller is recovered through the magnetic brush carried by the transportation roller.

The recovered toner is agitated with the carrier in the developing device 20d. Accordingly, the charged amount of toner to be carried by the developing roller anew is regulated to predetermined amount. The image creation condition regulation section 202 thus regulates the charged amount of toner and the like (i.e., an example of image creation conditions of the developing device 20d as the image creation related load).

Image Creation Condition Regulation Processing 1

Figure 6:
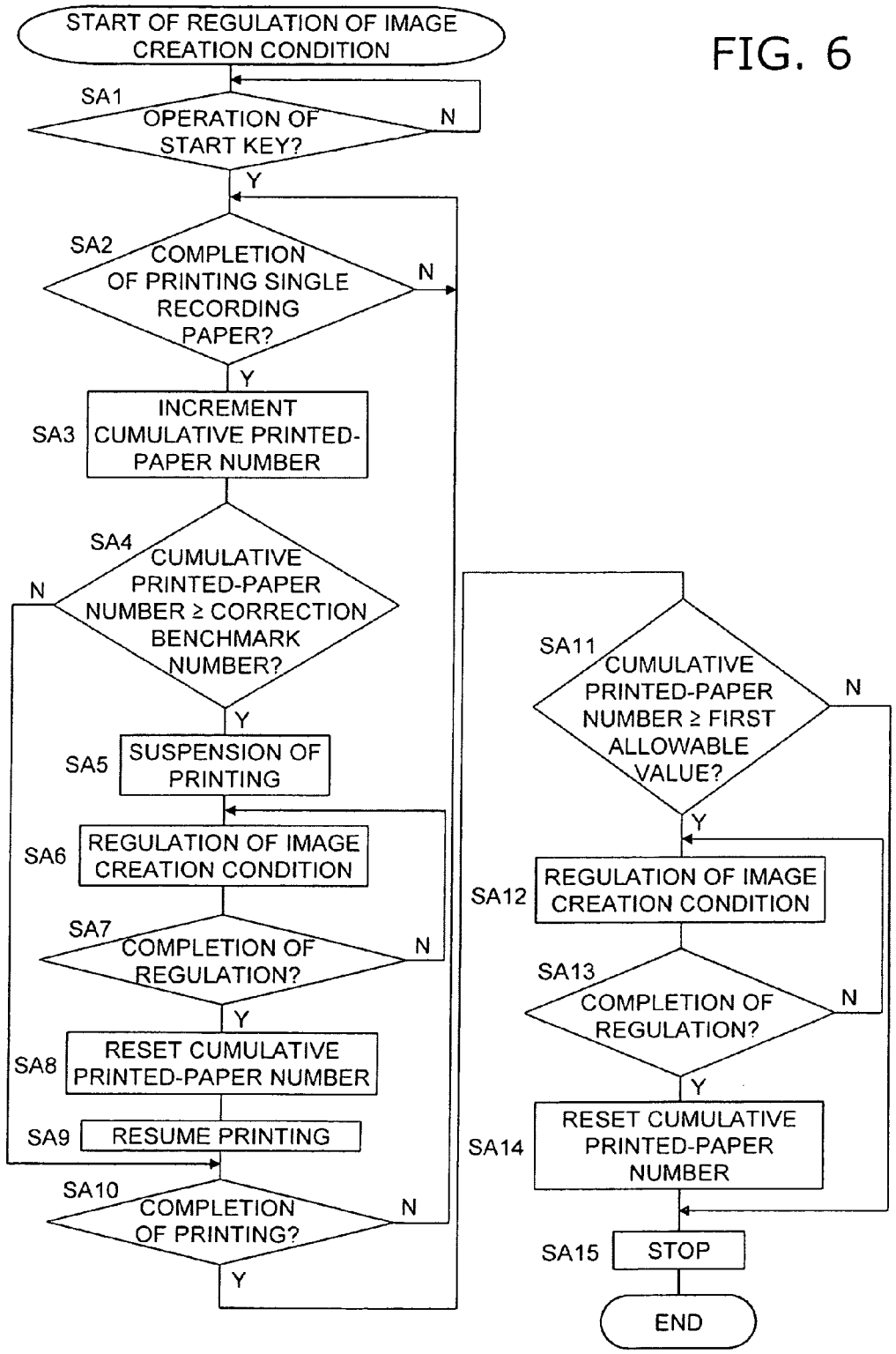
FIG. 6 is a view of a flowchart illustrating an operation executed by a functional section of the color digital copier that regulates an image creation condition.

Specific operations of the image creation condition correction control section 31 and the like will be hereinafter explained with reference to a flowchart in FIG. 6.

Referring to FIGS. 1, 3, 4, and 6 when a plurality of sheets of documents is put on the document feeder plate 11 and the start key is operated by a user, a print job is accordingly started. The image formation control section 201 controls the photosensitive units 20 and the like, and print processing is executed. Every time print processing is executed for a sheet of recording paper, the cumulative printed paper counter 30 increments the cumulative printed number of recording paper (Yes in Step SA1, Yes in Step SA2, and Step SA3).

When the cumulative printed number becomes the correction benchmark number or greater during a series of print processing executed by the image formation control section 201, the print processing is suspended and the image creation condition correction control section 31 activates the image creation condition regulation section 202. Accordingly, the image creation condition regulation section 202 regulates an image creation condition (Yes in Step SA4, and Steps SA5 and SA6).

When the image creation condition regulation section 202 completes regulation of an image creation condition, the cumulative printed paper counter 30 resets the cumulative printed number, and the image formation control section 201 resumes the print processing (Yes in Step SA7, and Steps SA8 and SA9).

When the cumulative printed number is less than the first allowable value after the image formation control section 201 completes the series of print processing executed, any processing for regulating an image creation condition are not particularly executed and the image formation control section 201 stops executing processing for regulating an image creation condition (Yes in Step SA10, No in SA11, and Step SA15).

On the other hand, when the cumulative printed number is equal to or greater than the first allowable value after the image formation control section 201 completes the series of print processing, the image creation condition correction control section 31 activates the image creation condition regulation section 202. Accordingly, the image creation condition regulation section 202 regulates an image creation condition (Yes in Step SA10, Yes in Step SA11, and Step SA12).

When the image creation condition regulation section 202 completes regulation of an image creation condition, the cumulative printed paper counter 30 resets the cumulative printed number and the image creation condition regulation section 202 is deactivated (Yes in Step SA13, and Steps SA14 and SA15).

Image Creation Condition Regulation Processing 2

Operations of the image creation condition correction control section 31 of another embodiment will be hereinafter explained. In the embodiment, when the cumulative printed number reaches the correction benchmark number during a series of print processing executed by the image formation control section 201, and further when the cumulative printed number is less than the second allowable value set to be greater than the correction benchmark number after the series of print processing, the image creation condition regulation section 202 is configured to be activated after the series of print processing.

For example, when the correction benchmark number is set to 500, the second allowable value is preferably set to 105-110% of 500. However, the second allowable number is not particularly limited as is the case with the first allowable value.

In this case, when the cumulative printed number is less than the second allowable value even if the cumulative printed number reaches the correction benchmark number during the series of print processing executed by the image formation control section 201, the series of processing is configured to be completed without being suspended.

Figure 7:
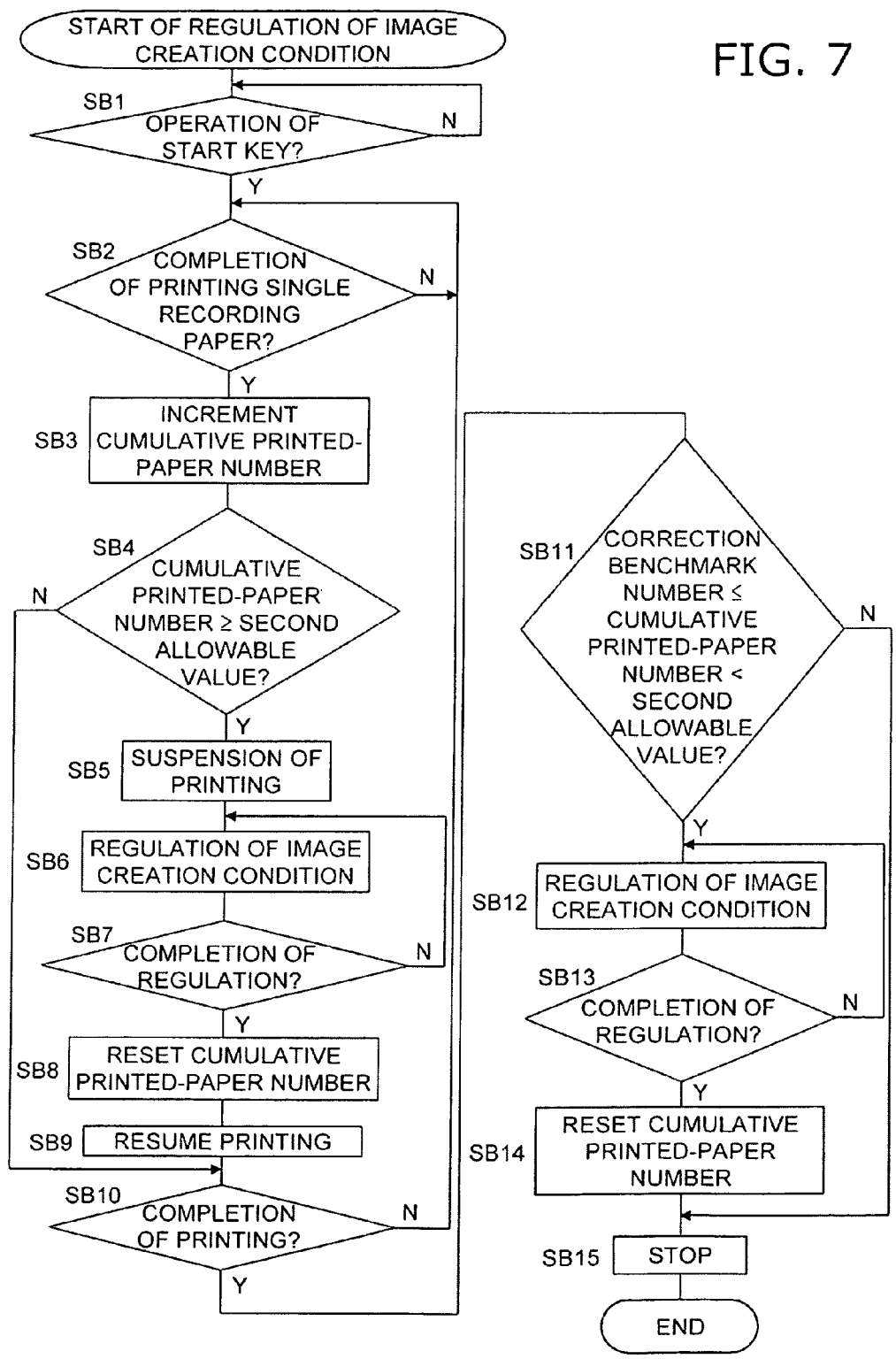
FIG. 7 is a view of a flowchart illustrating an operation executed by the functional section to regulate an image creation condition.

The following relates to an explanation of specific operations executed by the image creation condition correction control section 31 and the like when the image creation condition regulation section 202 is activated based on the second allowable value. A flowchart in FIG. 7 illustrates this.

As illustrated in FIGS. 1, 3, 4, and 7, when a plurality of sheets of documents is put on the document feeder plate 11 and the start key is operated by a user, a print job is accordingly started. The image formation control section 201 controls the photosensitive units 20 and the like, and print processing is executed. Every time print processing is executed for a sheet of recording paper, the cumulative printed paper counter 30 increments the cumulative printed number of recording paper (Yes in Step SB1, Yes in Step SB2, and Step SB3).

When the cumulative printed number becomes the second allowable value or greater during a series of print processing executed by the image formation control section 201, the print processing is suspended and the image creation condition correction control section 31 activates the image creation condition regulation section 202. Accordingly, the image creation condition regulation section 202 regulates an image creation condition (Yes in Step SB4, and Steps SB5 and SB6).

When the image creation condition regulation section 202 completes regulation of an image creation condition, the cumulative printed paper counter 30 resets the cumulative printed number, and the image formation control section 201 resumes the print processing (Yes in Step SB7, and Steps SB8 and SB9).

When the cumulative printed number is equal to or greater than the correction benchmark number and is simultaneously less than the second allowable value after the image formation control section 201 completes the series of print processing, the image creation condition correction control section 31 activates the image creation condition regulation section 202. Accordingly, the image creation condition regulation section 202 regulates an image creation condition (Yes in Step SB10, Yes in Step SB11, and Step SB12).

When the image creation condition regulation section 202 completes regulation of an image creation condition, the cumulative printed paper counter 30 resets the cumulative printed number, and the image creation condition regulation section 202 is deactivated (Yes in Step SB13, and Steps SB14 and SB15).

Image Creation Condition Regulation Processing 3

Figure 8:
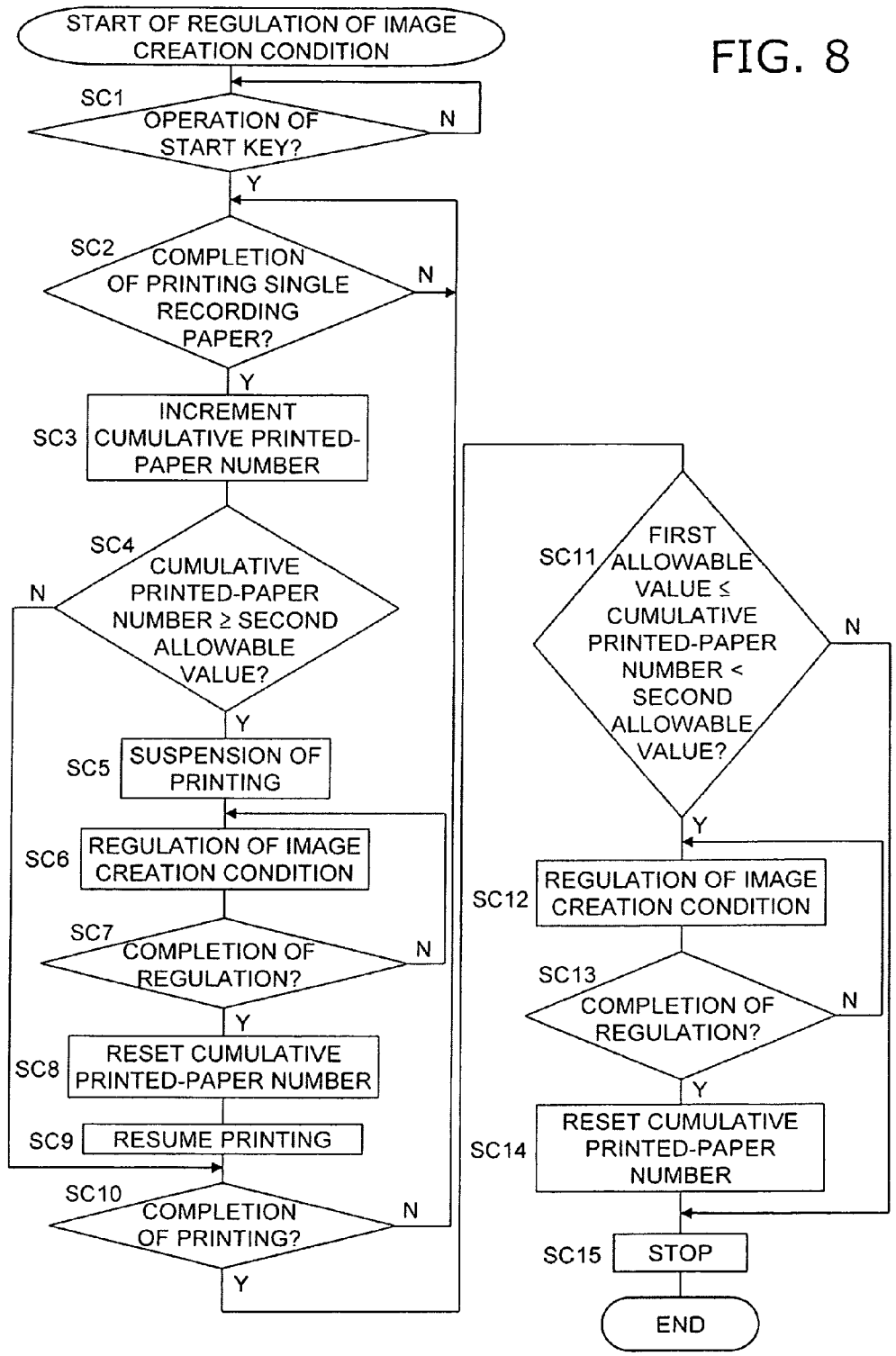
FIG. 8 is a view of a flowchart illustrating an operation executed by the functional section to regulate an image creation condition.

The following relates to an explanation of specific operations executed by the image creation condition correction control section 31 and the like when the image creation condition regulation section 202 is activated based on the first allowable value and the second allowable value. A flowchart in FIG. 8 illustrates this.

As illustrated in FIGS. 1, 3, 4, and 8, when a plurality of sheets of documents is put on the document feeder plate 11 and the start key is operated by a user, a print job is accordingly started. The image formation control section 201 controls the photosensitive units 20 and the like, and print processing is executed. Every time print processing is executed for a sheet of recording paper, the cumulative printed paper counter 30 increments the cumulative printed number of recording paper (Yes in Step SC1, Yes in Step SC2, and Step SC3).

When the cumulative printed number becomes the second allowable value or greater during a series of print processing executed by the image formation control section 201, the print processing is suspended and the image creation condition correction control section 31 activates the image creation condition regulation section 202. Accordingly, the image creation condition regulation section 202 regulates an image creation condition (Yes in Step SC4, and Steps SC5 and SC6).

When the image creation condition regulation section 202 completes regulation of an image creation condition, the cumulative printed paper counter 30 resets the cumulative printed number and the image formation control section 201 resumes print processing (Yes in Step SC7, and Steps SC8 and SC9).

When the cumulative printed number is equal to or greater than the first allowable value and is simultaneously less than the second allowable value after the series of print processing executed by the image formation control section 201, the image creation condition correction control section 31 activates the image creation condition regulation section 202. Accordingly, the image creation condition regulation section 202 regulates an image creation condition (Yes in Step SC10, Yes in Step SC11, and Step SC12).

When the image creation condition regulation section 202 completes regulation of an image creation condition, the cumulative printed paper counter 30 resets the cumulative printed number, and the image creation condition regulation section 202 is deactivated (Yes in Step SC13, and Steps SC14 and SC15).

Another Example of Regulation of Image Creation Condition

Example (a)

The aforementioned embodiment explains a case in which the image creation condition regulation section 202 recovers the developer on the developing sleeve 20*i* and refreshes the toner. However, the image creation condition regulation section 202 may be configured to discard the developer on the developing sleeve 20*i* and to regulate the charged amount of toner as an image creation condition of the developing device functioning as an image creation related load.

When the color digital copier 1 adopts a normal development method, a not-exposed area of the surface of the photosensitive body 20*c* excluding an exposed area thereof is developed with toner. Specifically, the image creation condition regulation section 202 is configured to cause the developing device 20*d* to develop the surface of the photosensitive body 20*c* without causing the exposure head 20*b* to expose it. Thus the toner on the developing sleeve 20*i* provided in the developing device 20*d* flies toward the photosensitive body 20*c*.

On the other hand, when the color digital copier 1 adopts a reversal development method, an exposed area of the surface of the photosensitive body 20*c* is developed with toner. Specifically, the image creation condition regulation section 202 is configured to cause the exposure head 20*b* to expose the entire surface of the photosensitive body 20*c* and to cause the developing device 20*d* to develop it. Thus the toner on the developing sleeve 20*i* provided in the developing device 20*d* flies toward the photosensitive body 20*c*.

Furthermore, regardless of the normal development method or the reversal development method, the image creation condition regulation section 202 may be configured to apply voltage to the developing sleeve 20*i* in the direction that toner flies toward the photosensitive body 20*c*. Accordingly, the toner on the developing sleeve 20*i* flies toward the photosensitive body 20*c*.

The toner that has landed on the photosensitive body 20*c* is transferred onto the intermediate transfer belt 21 and what remains after passing the secondary transfer roller 22 is subsequently removed by the fur brush 24. On the other hand, the toner remaining on the photosensitive body 20*c* is removed by the cleaning blade 20*f* disposed around the photosensitive body 20*c*. Thus the toner on the developing sleeve 20*i* is discarded, and the developing sleeve carries the developer anew. Consequently, the charged amount of developer (an image creation condition of the developing device 20*d* functioning as an image creation related load) is regulated. Also, the toner to be discarded may be removed by a cleaner provided to the photosensitive body by regulating transference bias voltage applied to the intermediate transfer belt 21 for preventing the toner that has landed on the photosensitive body 20*c* from being transferred onto the intermediate transfer belt 21 or for reducing the transference amount of the toner from the photosensitive body 20*c* onto the intermediate transfer belt 21.

Example (b)

The aforementioned embodiment explains that the image creation condition regulation section 202 is configured to regulate the charged amount of developer (i.e., an image creation condition). However, the image creation condition regulation section 202 may be configured to regulate the following image creation conditions for appropriately keeping gradation of the printed image: the development bias voltage; the charged voltage of the photosensitive body 20*c*; and a gradation conversion table.

Example (c)

Furthermore, the image creation condition regulation section 202 may be configured to regulate an image creation condition composed of exposure timing of the exposure head 20*b* to prevent colors of the printed image from misaligning (i.e., color misalignment) in the vertical direction or the horizontal direction.

Example (d)

Furthermore, the image creation condition regulation section 202 may be configured to regulate only one of the aforementioned image creation conditions. Also, the image creation condition regulation section 202 may be configured to regulate any combination of the aforementioned image creation conditions.

Operation for Regulating Development Bias Voltage

Figure 9:
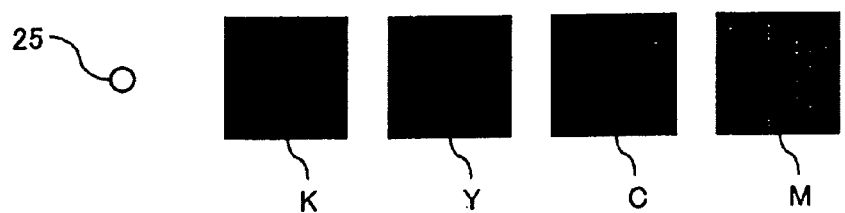
FIG. 9 is a view of a schematic diagram of toner patches created by the color digital copier.

The following relates to an explanation of an operation for regulating development bias voltage executed by the image creation condition regulation section 202. As illustrated in FIG. 9, the image creation condition regulation section 202 forms regulation patches (i.e., toner patches) of four colors on the intermediate transfer belt 21 at regular intervals in the travel direction of the intermediate transfer belt 21.

Specifically, based on test patch data to be outputted from the image processing section 13, the exposure head 20*b* and the developing device 20*d* forms images on the photosensitive body 20*c* and the images are then transferred onto the intermediate transfer belt 21 as the toner patches composed of a plurality of toner images of 100% or a predetermined halftone density. Note the test patch data are expressed by a preliminarily-set gradation pattern having a predetermined number of gradations.

As illustrated in FIG. 4, a pair of toner density sensors 25 is disposed in the downstream of the photosensitive units 20 and upstream of the secondary transfer roller 22. Each of the pair of toner density sensors 25 is composed of an infrared reflective photosensor and the like. The pair of toner density sensors 25 is configured to irradiate the four-color toner patches formed on the intermediate transfer belt 21, and to output toner density signals of predetermined levels based on the light reflected by the toner patches.

When the pair of toner density sensors 25 detects the toner patches of four colors, it is configured to output toner density signals corresponding to the four-color toner patches to a benchmark density detection section provided in the engine control section 200. The benchmark density detection section is configured to calculate density of the four-color toner patches based on the signal level outputted from the pair of toner density sensors 25.

The image creation condition regulation section 202 is configured to compare toner density (i.e., detected-density) of the four-color toner patches detected by the benchmark density detection section and the preliminarily-set toner density (i.e., set-density) of the four-color toner patches, and subsequently to maintain the detected-density to be the set-density by regulating the development bias voltage of the developing device 20d based on the difference between the detected-density and the set-density. For example, the development bias voltage is set to be high when the detected-density is low. On the other hand, the development bias voltage is set to be low when the detected-density is high.

Thus, the image creation condition regulation section 202 regulates voltage as an image creation condition of the development bias (i.e., an image creation related load) to be applied between the developing device 20d and the photosensitive body 20c.

Similarly, the image creation condition regulation section 202 is configured to regulate voltage to be applied to the electrostatic charger 20a for maintaining the detected-density to be the set-density. Accordingly, the image creation condition regulation section 202 regulates the charged voltage as an image creation condition of the photosensitive body 20c functioning as an image creation related load.

Operation for Regulating Gradation Conversion Table

The following relates to an explanation of an operation for regulating a gradation conversion table executed by the image creation condition regulation section 202. The gradation conversion table is a look-up table used for converting exposure intensity of the exposure head 20b for the purpose of allowing output image data to have a desired gradation with respect to input image data. For example, the gradation conversion table has a predetermined gradation feature as illustrated with curve (a) in FIG. 10.

Figure 10:
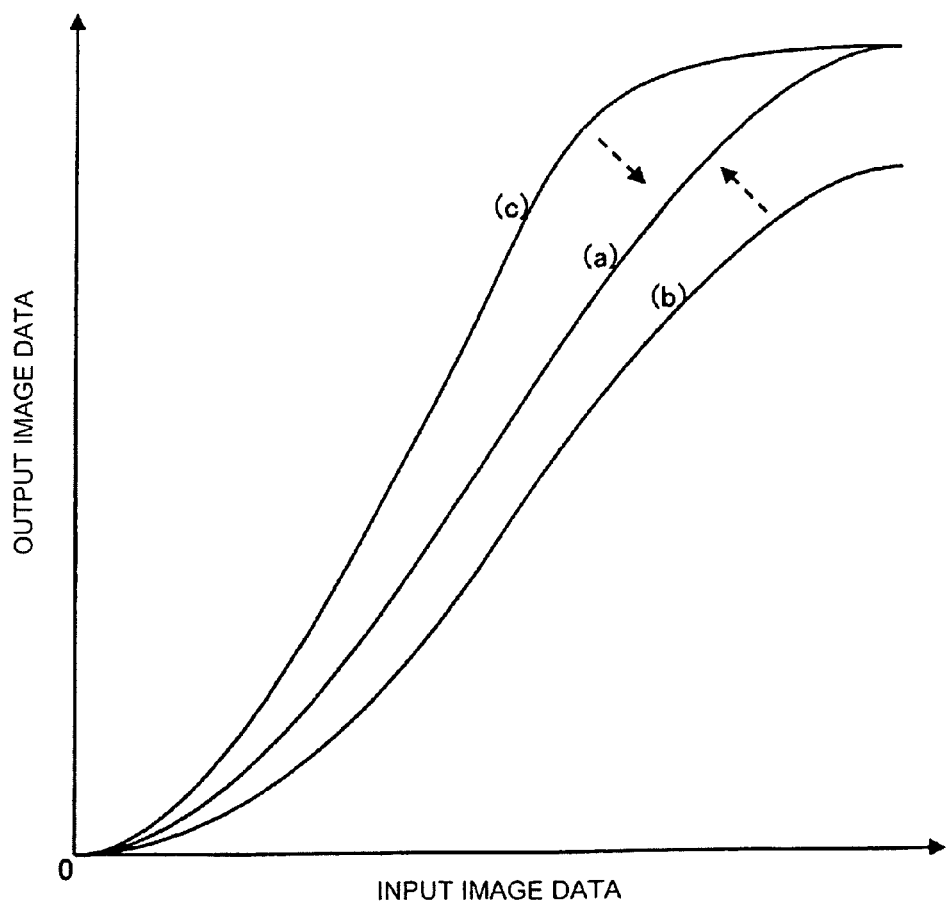
FIG. 10 is a chart for explaining a gradation conversion table to convert exposure intensity of an exposure head of the color digital copier to allow output image data to have a desired gradation with respect to input image data.

As illustrated with curve (b) in FIG. 10, the image creation condition regulation section 202 is configured to correct data of the gradation conversion table for making the gradation feature curve have steep slope (i.e., for increasing the toner density) when the density of the toner patches detected by the pair of toner density sensors 25 is less than the originally assumed value.

On the other hand, as illustrated with the curve (c) in FIG. 10, the image creation condition regulation section 202 is configured to correct data of the gradation conversion table for making the gradation feature curve have gradual slope (i.e., for reducing the toner density) when density of the toner patches detected by the pair of toner density sensors 25 is greater than the originally assumed value.

Thus, the image creation condition regulation section 202 regulates the gradation conversion table as an image creation condition for determining the exposure intensity of the exposure head 20b functioning as an image creation related load.

Operation for Regulating Exposure Timing

Figure 11A:
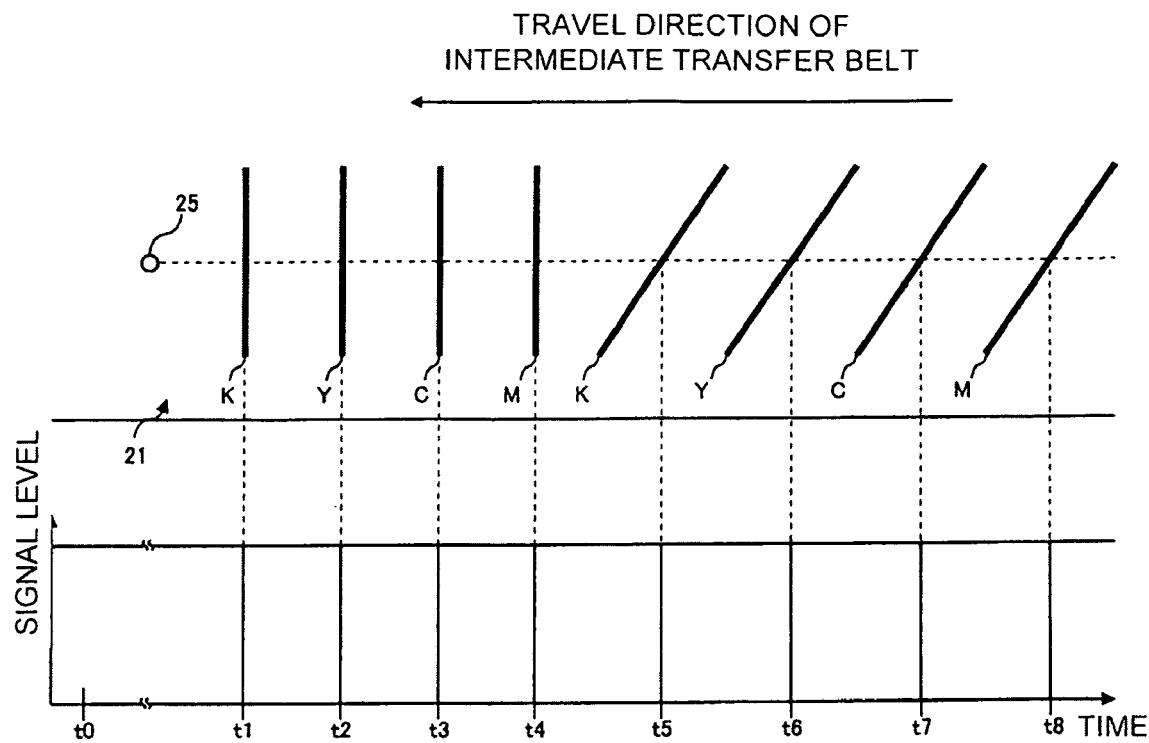
FIG. 11A is a view of a schematic diagram illustrating line patches and signal levels in detecting the line patches to regulate exposure timing of the exposure head.

The following relates to an explanation of an operation for regulating exposure timing of the exposure head 20b executed by the image creation condition regulation section 202. As illustrated in an upper part of FIG. 11A, the image creation condition regulation section 202 is configured to create four-color regulation patches (i.e., line patches) on the intermediate transfer belt 21 at a vertical or predetermined angle with respect to the travel direction of the intermediate transfer belt 21. The line patches are formed on the both edges of the intermediate transfer belt 21. The pair of toner density sensors 25 is disposed for detecting the line patches in corresponding positions to the line patch formation positions.

When the pair of toner density sensors 25 detects the line patches, the pair of toner density sensors 25 outputs the detection signal to a color misalignment measurement section provided in the engine control section 200. As illustrated in a lower part of FIG. 11A, the color misalignment measurement section is configured to binarize the level of the detection signal with predetermined threshold, obtain detection timing (t1, t2, . . . ) of the line patches formed in the photosensitive units 20, and measure a period of time from the exposure start timing (t0) to the detection timings (t1, t2, . . . ) of the already-formed line patches (i.e., vertical line patches in FIG. 11A).

The image creation condition regulation section 202 is configured to correct the exposure start timing for a printing-target image based on the measurement result by the color misalignment measurement section. Accordingly, resist in the vertical direction is regulated. On the other hand, the image creation condition regulation section 202 is configured to regulate magnification in the main-scanning direction and the like. Accordingly, resist in the horizontal direction is regulated and misalignment of colors is corrected. The vertical resist is corrected based on the detection timing of the vertical line patches whereas the horizontal resist is corrected based on the detection timing of the line patches at a predetermined angle.

Thus, the image creation condition regulation section 202 regulates the exposure timing as an image creation condition of the exposure head functioning as an image creation related load.

Figure 11B:
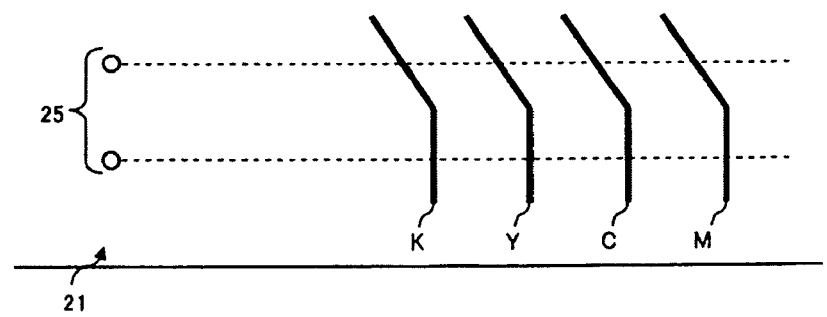
FIG. 11B is a schematic diagram of alternate line patches.

Furthermore, as illustrated in FIG. 11B, the image creation condition regulation section 202 may be configured to form line patches by integrating line patches for regulating the vertical resist and line patches for regulating the horizontal resist. In this case, two pairs of toner density sensors 25 are disposed for detecting the integrated line patches formed on both edges of the intermediate transfer belt 21. Additionally, each pair of toner density sensors 25 is disposed for detecting the both patch components of the integrate line patches in corresponding positions. Accordingly, it is possible to reduce the measurement time measured by the color misalignment measurement section configured to measure a period of time from the exposure start timing to the detection timing. In other words, it is possible to reduce the time necessary for regulating an image creation condition.

Image Creation Condition Regulation Processing 4

According to the aforementioned embodiments, the image creation condition correction control section 31 is configured to activate the image creation condition regulation section 202 based on the cumulative number of recording paper printed out in the series of print processing by the image formation control section 201. However, the image creation condition correction control section 31 may be configured to activate the image creation condition regulation section 202 based on cumulative operation time. The cumulative operation time is a period of time during driving of a load from the leading edge till the trailing edge of a print operation.

The system control section 3 is provided with an operation time measurement section. Thus, the system control section also functions as a measurement device to measure a cumulative operation time in a series of image formation processing. For example, the developing sleeve 20i is configured to start driving when the image formation control section 201 is activated, but is configured to stop driving when the image formation control section 201 is deactivated. Accordingly, the operation time measurement section is configured to measure cumulative operation time of the image formation control section 201 based on driving time of the developing motor for driving the developing sleeve 20i.

However, it should be apparent from this disclosure that it is possible to measure the cumulative operation time of the image formation control section 201 by other driving time excluding the driving time of the developing motor. For example, driving time of a motor for driving the photosensitive body 20c or that of a motor for driving the intermediate transfer belt 21 may be used. Motors of this type are normally configured to be driven first when a start switch is operated, but is configured to be stopped last when a printing operation is completed. Accordingly, when the overhead time before and after the print processing is included in the cumulative operation time, the motors have an advantage for accurately monitoring a deteriorated condition of the toner to be agitated by the developing device and the like by measuring the cumulative operation time.

The cumulative operation time measurement section is configured to measure driving time of the developing motor and update the cumulative operation time by adding the driving time of the developing motor to the cumulative operation time stored in the RAM. Furthermore, the cumulative operation time measurement section is configured to reset each cumulative operation time when the image creation condition regulation section 202 is activated.

When the cumulative operation time reaches first allowable value after the image formation control section 201 completes the series of print processing, the image creation condition correction control section 31 is configured to activate the image creation condition regulation section 202 after the series of print processing. In this case, the first allowable value is set to be less than operation time preliminarily set as threshold for activating the image creation condition regulation section 202 (hereinafter referred to as "correction benchmark operation time").

Figure 12:
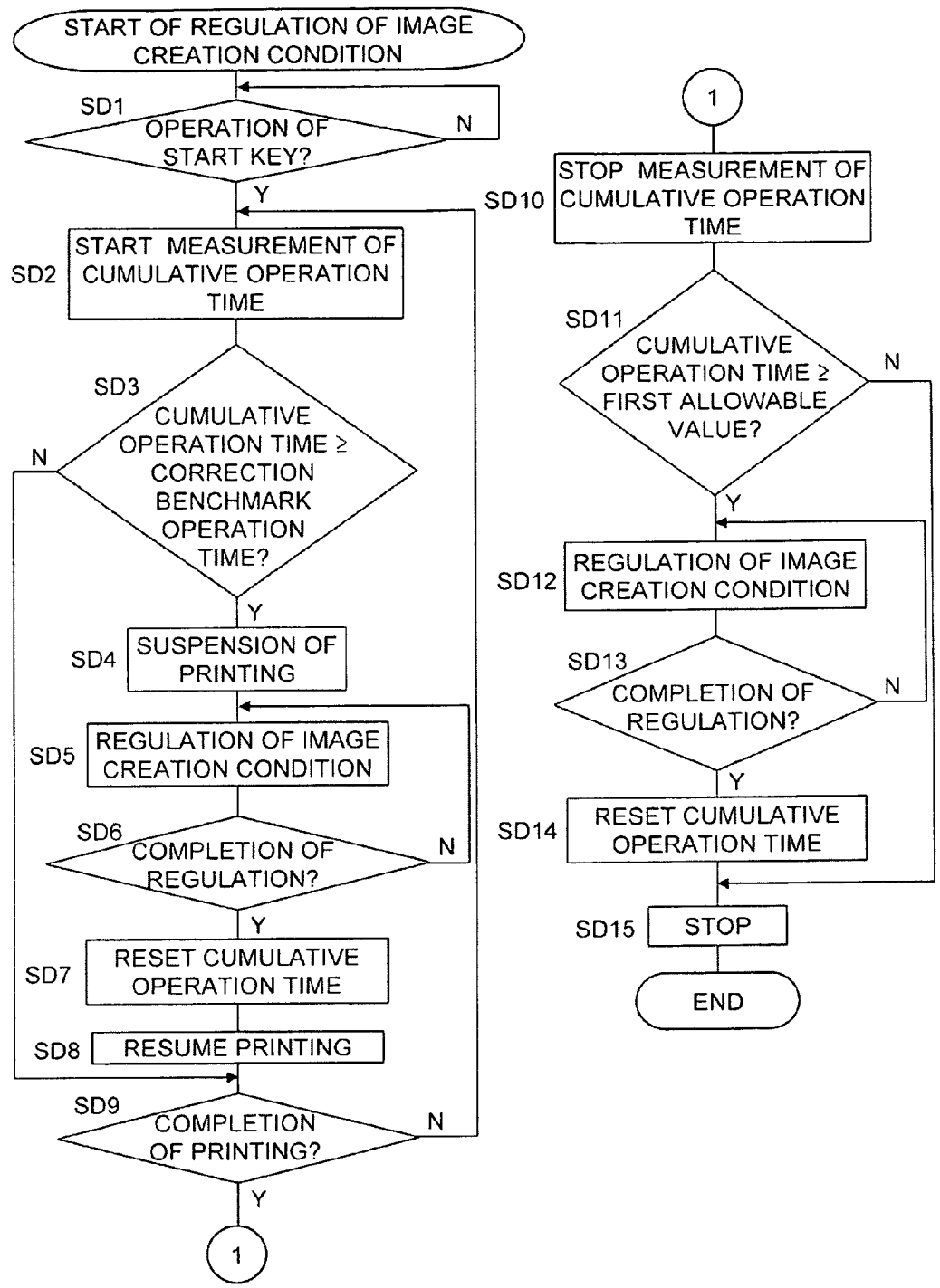
FIG. 12 is a view of a flowchart illustrating an operation executed by the functional section to regulate an image creation condition in another embodiment.

The following relates to specific operations executed by the image creation condition correction control section 31 and the like. A flowchart of FIG. 12 illustrates this.

As illustrated in FIGS. 1, 3, 4, and 12, when a plurality of sheets of documents are put on the document feeder plate 11 and the start key is operated by a user, a print job is accordingly started. The developing motor is driven in conjunction with the activation of the image formation control section 201, and the cumulative operation time measurement section measures the cumulative operation time (Yes in Step SD1, and Step SD2).

When the cumulative operation time becomes the correction benchmark operation time or greater during a series of print processing executed by the image formation control section 201, the print processing is suspended and the image creation condition correction control section 31 activates the image creation condition regulation section 202. Accordingly, the image creation condition regulation section 202 regulates an image creation condition (Yes in Step SD3, and Steps SD4 and SD5).

When the image creation condition regulation section 202 completes regulation of an image creation condition, the cumulative operation time measurement section resets the cumulative operation time, and the image formation control section 201 resumes the print processing (Yes in Step SD6, and Steps SD7 and SD8).

After the image formation control section 201 completes the series of print processing, the developing motor is deactivated in conjunction with deactivation of the image formation control section 201, and the cumulative operation time measurement section stops measuring the cumulative operation time (Yes in Step SD9, and Step SD10).

When the cumulative operation time is less than the first allowable value, the image creation condition correction control section 31 does not activate the image creation condition regulation section 202 (No in Step SD11, and Step SD15).

On the other hand, when the cumulative operation time is greater than the first allowable value, the image creation condition correction control section 31 activates the image creation condition regulation section 202. Accordingly, the image creation condition regulation section 202 regulates an image creation condition (Yes in Step SD11, and Step SD12).

When the image creation condition regulation section 202 completes regulation of an image creation condition, the cumulative operation time measurement section resets the cumulative operation time, and the image creation condition regulation section 202 is deactivated (Yes in Step SD13, and Steps SD14 and SD15).

Image Creation Condition Regulation Processing 5

When the cumulative operation time reaches the correction benchmark operation time during a series of print processing executed by the image formation control section 201 and the cumulative operation time is less than the second allowable value set to be greater than the correction benchmark operation time after the series of print processing, the image creation condition correction control section 31 may be configured to activate the image creation condition regulation section 202 after the series of print processing.

Figure 13:
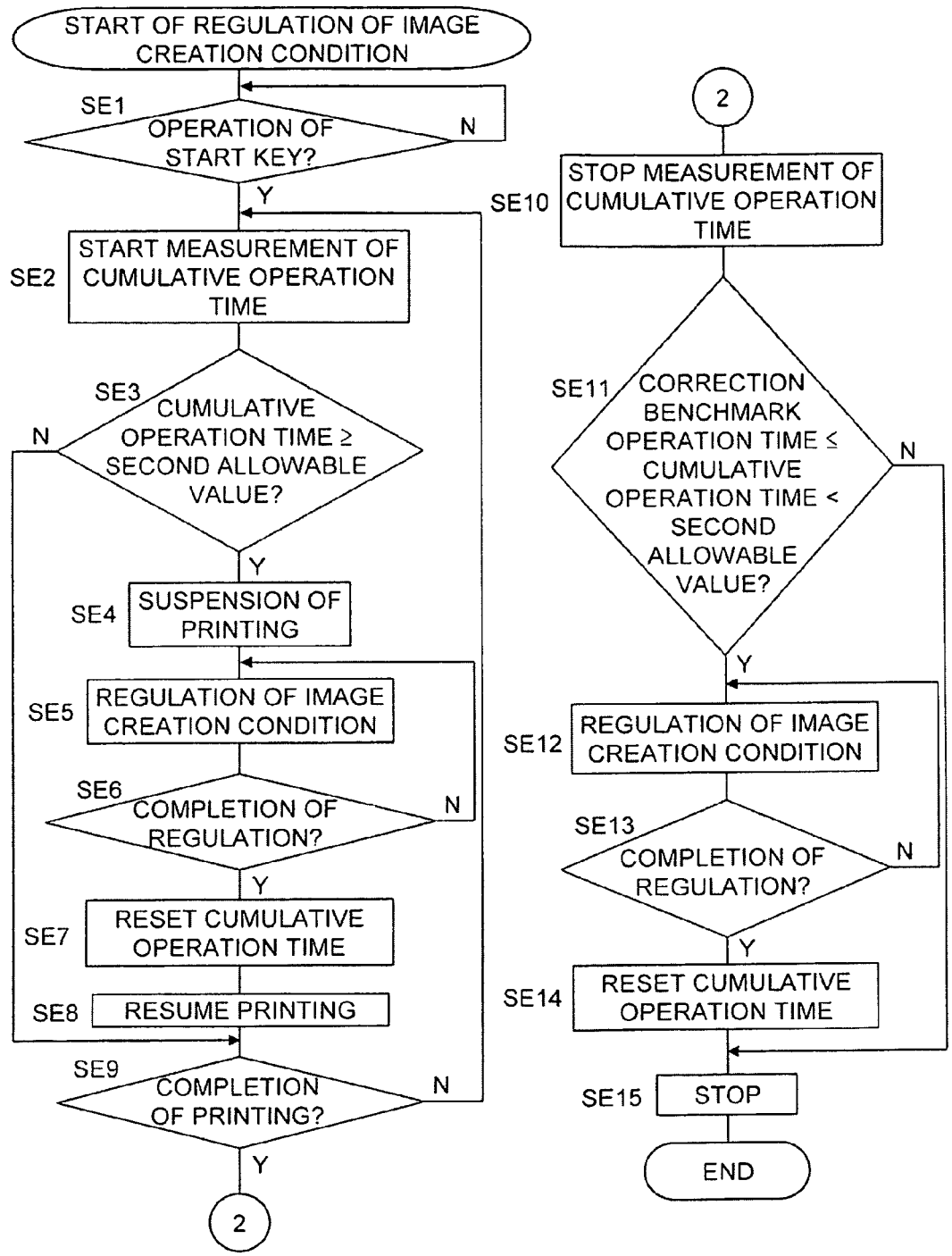
FIG. 13 is a view of a flowchart illustrating an operation executed by the functional section to regulate an image creation condition in yet another embodiment.

The following relates to an explanation of specific operations executed by the image creation condition correction control section 31 and the like when the image creation condition regulation section 202 is activated based on the second allowable value. A flowchart in FIG. 13 illustrates this.

As illustrated in FIGS. 1, 3, 4, and 13, when a plurality of sheets of documents are put on the document feeder plate 11 and the start key is operated by a user, a print job is accordingly started. The developing motor is driven in conjunction with the activation of the image formation control section 201, and the cumulative operation time measurement section measures the cumulative operation time (Yes in Step SE1, and Step SE2).

When the cumulative operation time becomes the second allowable value or greater during a series of print processing executed by the image formation control section 201, the print processing is suspended and the image creation condition correction control section 31 activates the image creation condition regulation section 202. Accordingly, the image creation condition regulation section 202 regulates an image creation condition (Yes in Step SE3, and Steps SE4 and SE5).

When the image creation condition regulation section 202 completes regulation of an image creation condition, the cumulative operation time measurement section resets the cumulative operation time, and the image formation control section 201 resumes the print processing (Yes in Step SE6, and Steps SE7 and SE8).

After the image formation control section 201 completes the series of print processing, the developing motor is deactivated in conjunction with the deactivation of the image formation control section 201 and the cumulative operation time measurement section stops measuring the cumulative operation time (Yes in Step SE9, and Step SE10).

When the cumulative operation time is equal to or greater than the correction benchmark operation time and is simultaneously less than the second allowable value, the image creation condition correction control section 31 activates the image creation condition regulation section 202. Accordingly, the image creation condition regulation section 202 regulates an image creation condition (Yes in Step SE11, and Step SE12).

When the image creation condition regulation section 202 completes regulation of an image creation condition, the cumulative operation time measurement section resets the cumulative operation time, and the image creation condition regulation section 202 is deactivated (Yes in Step SE13, Steps SE14 and SE15).

Image Creation Condition Regulation Processing 6

The following relates to an explanation of specific operations executed by the image creation condition correction control section 31 and the like when the image creation condition regulation section 202 is activated based on the first allowable value and the second allowable value. A flowchart of FIG. 14 illustrates this.

Figure 14:
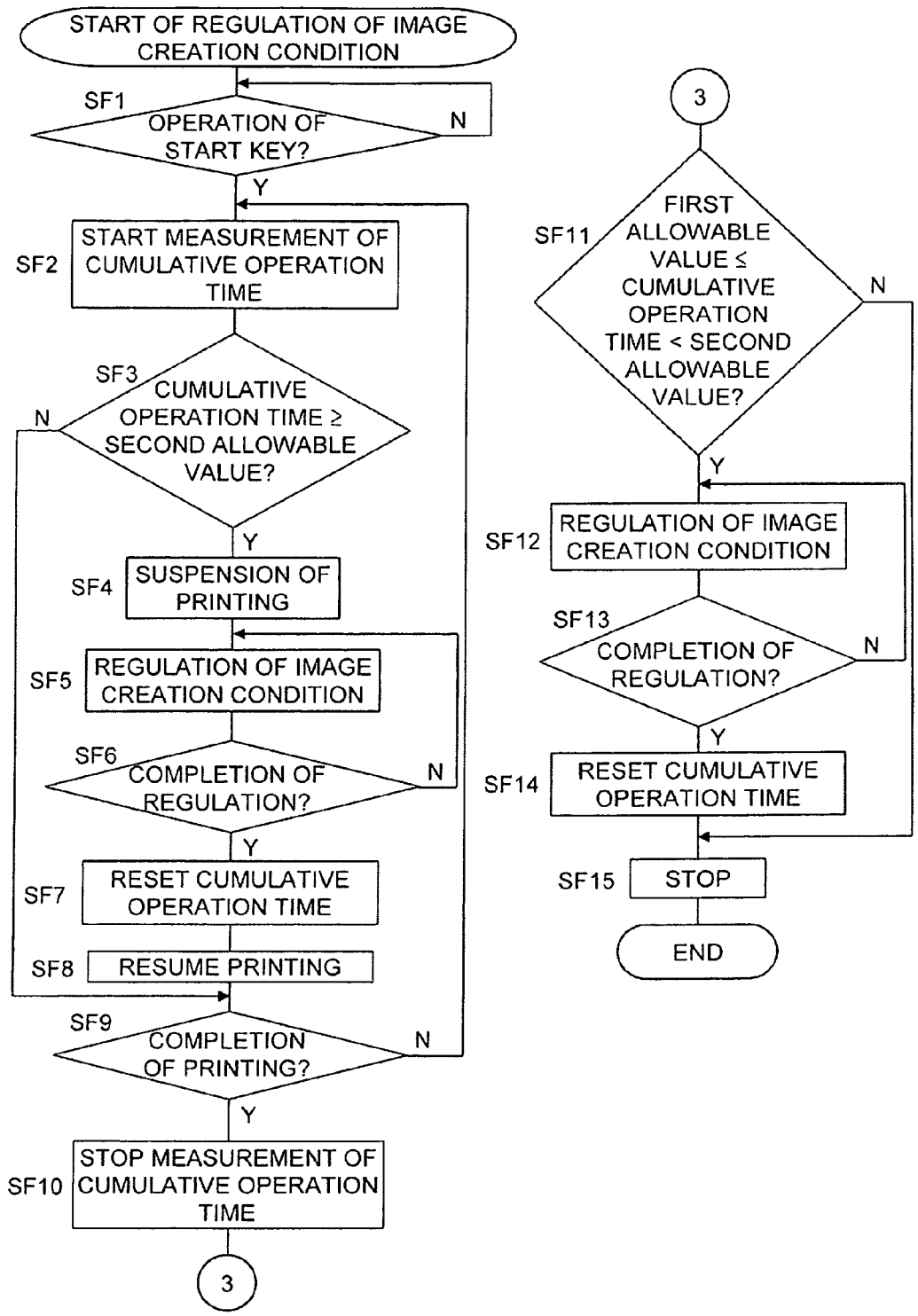
FIG. 14 is a view of a flowchart illustrating an operation executed by the functional section to regulate an image creation condition in still another embodiment.

As illustrated in FIG. 14, when a plurality of sheets of documents is put on the document feeder plate 11 and the start key is operated by a user, a print job is accordingly started. The developing motor is driven in conjunction with activation of the image formation control section 201, and the cumulative operation time measurement section measures the cumulative operation time (Yes in Step SF1, and Step SF2).

When the cumulative operation time becomes the second allowable value or greater during a series of print processing executed by the image formation control section 201, the print processing is suspended and the image creation condition correction control section 31 activates the image creation condition regulation section 202. Accordingly, the image creation condition regulation section 202 regulates an image creation condition (Yes in Step SF3, and Steps SF4 and SF5).

When the image creation condition regulation section 202 completes regulation of an image creation condition, the cumulative operation time measurement section resets the cumulative operation time, and the image formation control section 201 resumes the print processing (Yes in Step SF6, and Steps SF7 and SF8).

After the image formation control section 201 completes the series of print processing, the developing motor is deactivated in conjunction with the deactivation of the image formation control section 201, and the cumulative operation time measurement section stops measuring the cumulative operation time (Yes in Step SF9, and Step SF10).

When the cumulative operation time is equal to or greater than the first allowable value and is simultaneously less than the second allowable value, the image creation condition correction control section 31 activates the image creation condition regulation section 202. Accordingly, the image creation condition regulation section 202 regulates an image creation condition (Yes in Step SF11, and Step SF12).

When the image creation condition regulation section 202 completes regulation of an image creation condition, the cumulative operation time measurement section resets the cumulative operation time, and the image creation condition regulation section 202 is deactivated (Yes in Step SF13, and Steps SF14 and SF15).

Other Example Embodiments of Image Forming Apparatus

In the aforementioned embodiment, the color digital copier 1 for one-side printing is exemplified as the image forming apparatus of the present invention. However, the present invention is not limited to this. For example, a color digital copier for duplex printing may be used as the image forming apparatus of the present invention.

Additionally, a digital copier for monochrome printing may be used as the image forming apparatus of the present invention. Furthermore, the image forming apparatus of the present invention is not limited to a copier. For example, the image forming apparatus may be any suitable photographic image forming apparatus such as a printer and a so-called multifunctional peripheral (MFP) having a plurality of functions (e.g., a copier function, a printer function and a facsimile function).

General Interpretation

A used herein, the following directional terms "forward, rearward, above, downward, vertical, horizontal, below, and transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device includes hardware and/or software that is constructed and/or programmed to carry out the desired function.

Terms that are expressed as "means-plus function" in the claims should include any structure that can be utilized to carry out the function of that part of the present invention.

The term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An image forming apparatus, comprising:
an image forming unit including a plurality of functional sections for image formation, each of the functional sections being configured to control an image creation condition, each of the functional sections contributing to image formation in the image creation condition;
an image formation control section being configured to control the functional sections to cause the image formation unit to execute image formation processing;
a counter counting a cumulative printed-paper number in a series of image formation processing;

an image creation condition regulation section regulating an image creation condition of at least one of the functional sections;

a controlled printed-paper number storage section storing a benchmark printed-paper number and first allowable value to determine a timing of regulating the image creation condition, the first allowable value being set to be less than the benchmark printed-paper number; and a regulation control section activating the image creation condition regulation section after the series of image formation processing when the cumulative printed-paper number is equal to or greater than the first allowable value after the series of image formation processing, wherein the first allowable value is set to be equal to or greater than 90% of the benchmark printed number and is simultaneously set to be equal to or less than 95% of the benchmark printed number.

2. The image formation apparatus according to claim 1, wherein the regulation control section is configured to suspend the series of image formation processing and to activate the image creation condition regulation section when the cumulative printed-paper number reaches the benchmark printed-paper number during the series of image formation processing.

3. The image formation apparatus according to claim 1, wherein the controlled printed-paper number storage section stores second allowable value, the second allowable value being set to be greater than the benchmark printed-paper number, and the regulation control section is configured to activate the image creation condition regulation section after the series of image formation processing when the cumulative printed-paper number is equal to or greater than the first allowable value and is simultaneously less than the second allowable value after the series of image formation processing, and the second allowable value is set to be equal to or greater than 105% of the benchmark printed-paper number and is simultaneously set to be equal to or less than 110% of the benchmark printed-paper number.

4. The image forming apparatus according to claim 1, further comprising a system control section to reset the count of the counter when the image creation condition regulation section is activated.

5. An image forming apparatus, comprising:

an image forming unit including a plurality of functional sections for image formation, each of the functional sections being configured to control an image creation condition, each of the functional sections contributing to image formation in the image creation condition;

an image formation control section being configured to control the functional sections to cause the image formation unit to execute image formation processing;

a counter counting a cumulative printed-paper number in a series of image formation processing;

an image creation condition regulation section regulating an image creation condition of at least one of the functional sections;

a controlled printed-paper number storage section storing a benchmark printed-paper number and first allowable value to determine a timing of regulating the image creation condition, the first allowable value being set to be less than the benchmark printed-paper number; and a regulation control section activating the image creation condition regulation section after the series of image formation processing when the cumulative printed-paper number is equal to or greater than the first allowable value after the series of image formation processing, wherein the controlled printed-paper number storage section stores a second allowable value, the second allowable value being set to be greater than the benchmark printed-paper number, the regulation control section is configured to activate the image creation condition regulation section after the series of image formation processing when the cumulative printed-paper number is equal to or greater than the benchmark printed-paper number and is simultaneously less than the second allowable value after the series of image formation processing, and the second allowable value is set to be equal to or greater than 105% of the benchmark printed-paper number and is simultaneously set to be equal to or less than 110% of the benchmark printed-paper number.

6. The image formation apparatus according to claim 5, wherein the regulation control section is configured to suspend the series of image formation processing and to activate the image creation condition regulation section when the cumulative printed-paper number reaches the second allowable value during the series of image formation processing.

7. The image formation apparatus according to claim 5, wherein the controlled printed-paper number storage section stores second allowable value, the second allowable value being set to be greater than the benchmark printed-paper number, and the regulation control section is configured to activate the image creation condition regulation section after the series of image formation processing when the cumulative printed-paper number is equal to or greater than the first allowable value and is simultaneously less than the second allowable value after the series of image formation processing.

8. The image formation apparatus according to claim 5, wherein the regulation control section is configured to suspend the series of image formation processing and to activate the image formation condition regulation section when the cumulative printed-paper number reaches the second allowable value during the series of image formation processing.

9. An image forming apparatus, comprising:

an image forming unit including a plurality of functional sections for image formation, each of the functional sections being configured to control an image creation condition, each of the functional sections contributing to the image formation in the image creation condition;

an image formation control section being configured to control the functional sections to cause the image forming unit to execute processing of the image formation;

a measurement device to measure a cumulative operation time in a series of image formation processing;

an image formation condition regulation section regulating an image formation condition of at least one of the functional sections;

a controlled time storage section storing a benchmark operation time and first allowable value to determine timing of regulating the image creation condition, the first allowable value being set to be less than the benchmark operation time; and a regulation control section activating the image creation condition regulation section after the series of image formation processing when the cumulative operation time is equal to or greater than the first allowable value after the series of image formation processing, wherein the controlled printed-paper number storage section stores a second allowable value, the second allowable value being set to be greater than the benchmark operation time, the regulation control section is configured to activate the image creation condition regulation section after the series of image formation processing when the cumulative operation time is equal to or greater than the benchmark operation time and is simultaneously less than the second allowable value after the series of image formation processing, and the regulation control section is configured to suspend the series of image formation processing and to activate the image formation condition regulation section when the cumulative printed-paper number reaches the second allowable value during the series of image formation processing.

10. The image forming apparatus according to claim 9, wherein the regulation control section is configured to suspend the series of image formation processing and to activate the image creation condition regulation section when the cumulative operation time reaches the benchmark operation time during the series of image forming processing.

11. The image forming apparatus according to claim 9, further comprising a system control section to reset measurement of the time measurement device when the image creation condition regulation section is activated.

12. An image forming apparatus, comprising:

an image forming unit including a plurality of functional sections for image formation, each of the functional sections being configured to control an image creation condition, each of the functional sections contributing to the image formation in the image creation condition;

an image formation control section being configured to control the functional sections to cause the image forming unit to execute processing of the image formation;

a measurement device to measure a cumulative operation time in a series of image formation processing;

an image formation condition regulation section regulating an image formation condition of at least one of the functional sections;

a controlled time storage section storing a benchmark operation time and first allowable value to determine timing of regulating the image creation condition, the first allowable value being set to be less than the benchmark operation time; and a regulation control section activating the image creation condition regulation section after the series of image formation processing when the cumulative operation time is equal to or greater than the first allowable value after the series of image formation processing, wherein the controlled time storage section stores second allowable value, the second allowable value being set to be greater than the benchmark operation time, the regulation control section is configured to activate the image creation condition regulation section after the series of image formation processing when the cumulative operation time is equal to or greater than the first allowable value and is simultaneously less than the second allowable value after the series of image formation processing, and the regulation control section is configured to suspend the series of image formation processing and to activate the image creation condition regulation section when the cumulative operation time reaches the second allowable value during the series of image formation processing.

* * * * *